(12) United States Patent
Gramm

(10) Patent No.: US 6,202,395 B1
(45) Date of Patent: Mar. 20, 2001

(54) COMBINE HEADER HEIGHT CONTROL

(76) Inventor: Richard Gramm, 10209 Iris Rd., Plymouth, IN (US) 46563

( * ) Notice: Subject to any disclaimer, the term of this patent is extended or adjusted under 35 U.S.C. 154(b) by 0 days.

(21) Appl. No.: 09/223,921

(22) Filed: Dec. 31, 1998

Related U.S. Application Data

(60) Provisional application No. 60/070,165, filed on Dec. 31, 1997.

(51) Int. Cl.$^7$ .................................................. A01D 75/28
(52) U.S. Cl. ............................................. 56/10.2 E; 172/4
(58) Field of Search ............................. 56/119, 17.1, 17.2, 56/121.46, 10.2 D, 10.2 E, DIG. 3, DIG. 10, 51, 94, 73, 84; 172/2, 4; 33/501.02, 501.03, 553, 554, 555

(56) References Cited

U.S. PATENT DOCUMENTS

| | | | |
|---|---|---|---|
| 3,611,286 | * 10/1971 | Cleveland | 340/61 |
| 3,886,718 | * 6/1975 | Talbot | 56/208 |
| 3,896,899 | * 7/1975 | Scholl | 172/4.5 |
| 4,064,945 | 12/1977 | Haney | 172/4 |
| 4,171,606 | * 10/1979 | Zeigler et al. | 56/10.2 |
| 4,180,133 | * 12/1979 | Collogan et al. | 172/26 |
| 4,199,925 | * 4/1980 | Quick et al. | 56/208 |
| 4,211,057 | * 7/1980 | Dougherty et al. | 56/10.2 |
| 4,332,126 | * 6/1982 | Van Auwelaer et al. | 56/10.2 |
| 4,437,295 | * 3/1984 | Rock | 56/10.2 |
| 4,567,719 | * 2/1986 | Soots et al. | 56/10.2 |
| 4,594,940 | * 6/1986 | D'Almeida et al. | 56/11.2 |
| 4,607,716 | * 8/1986 | Beck | 180/131 |
| 4,776,153 | 10/1988 | DePauw et al. | 56/10.2 |
| 4,928,890 | * 5/1990 | Swisher, Jr. | 241/24 |
| 5,090,184 | 2/1992 | Garter et al. | 56/10.2 |

(List continued on next page.)

FOREIGN PATENT DOCUMENTS

704545 * of 1965 (CA) .................................. 56/10.2 E

OTHER PUBLICATIONS

M & W Robot Header Control, author unknown, M & W Gear Company, pp. 1–4, Nov. 1964.*

Primary Examiner—Robert E. Pezzuto
Assistant Examiner—Nathan Mammen
(74) Attorney, Agent, or Firm—Emrich & Dithmar

(57) ABSTRACT

An arrangement for controlling the height above or depth below an irregular surface of a body moving over or below the surface includes a rotation sensor coupled to a controller responsive to an angular deflection signal output by the rotation sensor. The rotation sensor and controller are mounted to a vehicle moving over the surface such as an agricultural vehicle traversing a field. A semi-rigid, flexible arm has a first end coupled to the rotation sensor with a ground engaging member attached to a second opposed end of the arm. In one embodiment, the flexible arm includes an elongated coil spring attached to a rigid shaft and the ground engaging member is a spherical ball attached to the shaft's distal end. The coil spring is pre-loaded to a selected bending or flexure force and permits the ground engaging member to impact obstructions in the field without damage to the rotation sensor. The coil spring also prevents damage to the rotation sensor when the vehicle is reversed in direction. The flexible arm may be urged downwardly to ensure that the ground engaging member contacts the soil and upward and downward rotation stops may be provided to limit rotation of the rotation sensor and flexible arm combination. When a plurality of rotation sensors and flexible arms are employed such as along the length of a combine header, each rotation sensor may be individually calibrated by rotating the sensor relative to the head unit to which it is mounted to permit all sensors to uniformly measure the height above or depth below the soil surface.

34 Claims, 4 Drawing Sheets

U.S. PATENT DOCUMENTS

| | | | |
|---|---|---|---|
| 5,115,628 | | 5/1992 | Garter et al. .......................... 56/10.2 |
| 5,189,806 | * | 3/1993 | McMurtry et al. .................... 33/553 |
| 5,195,309 | * | 3/1993 | Mossman ............................... 56/119 |
| 5,463,854 | * | 11/1995 | Chmielewski, Jr. et al. .... 56/10.2 E |
| 5,471,823 | * | 12/1995 | Panoushek et al. .............. 56/10.2 E |
| 5,471,825 | * | 12/1995 | Panoushek et al. .............. 56/10.2 E |
| 5,473,870 | * | 12/1995 | Panuoushek et al. ............ 56/10.2 E |
| 5,535,577 | * | 7/1996 | Chmielewski et al. ........... 56/10.2 E |
| 5,549,166 | * | 8/1996 | Orbach et al. ............................ 172/4 |
| 5,713,190 | * | 2/1998 | Vermeulen et al. .............. 56/10.2 E |
| 5,957,218 | * | 9/1999 | Noonan et al. ....................... 172/239 |
| 6,041,583 | * | 3/2000 | Goering et al. .................. 56/10.2 E |

* cited by examiner

COMBINE HEADER HEIGHT CONTROL

RELATED APPLICATION

This application claims the benefit of copending U.S. Provisional Application No. 60/070,165, filed Dec. 31, 1997.

FIELD OF THE INVENTION

This invention relates generally to agricultural machinery and is particularly directed to apparatus for detecting and controlling the height above the soil of an agricultural machine as it traverses a field.

BACKGROUND OF THE INVENTION

In many agricultural applications it is important to control the depth of a ground engaging implement. In other agricultural applications, it is important to maintain an agricultural machine component above the soil a predetermined, fixed height. One example of the latter application is in a combine header used in the harvesting of crops. The individual heads must be maintained for a given height above the soil to avoid damage to the head caused by impact with the soil or other obstruction such as a rock. Positioning the header too close to the soil may also result in ingestion of non-crop debris which reduces harvesting efficiency and may also cause damage to the combine. The head must also not be raised too high to avoid missing down plants which do not extend upwardly a sufficient distance. The trend today is toward the use of larger headers having increased numbers of individual heads mailing it more difficult to monitor and adjust head height to avoid damage. A prime objective in crop harvesting is to cover as much ground as possible by operating at high speeds which increases the possibility of header damage caused by irregular terrain or hazards in the field. With increased combine operating speeds, monitoring and adjusting head height is made even more difficult. Header repairs are costly and time consuming.

There are various approaches to maintaining the header a predetermined height above the soil. One such approach employs a curved bar attached to an intermediate, lower portion of the head which engages the soil as the combine traverses a field. A chain couples a distal end of the bar to the head for preventing breakage of the bar in the event the bar engages a hazard in the field when the combine is put in reverse. The curved bar functions as a sensor, detecting the height of the head above the soil, and provides a feedback signal to a height controller in the combine for adjusting header height. This sensor mechanism is adapted for attachment to a head having a metal housing and is not easily mounted to current polyurethane head housings which are gaining increasing acceptance because of their light weight. In addition, the curved bar is attached to an intermediate portion of the head housing and thus sometimes provides a height adjustment signal too late to protect the forward end of the housing as it traverses a field. Another approach to header height control employs a pulsed ultrasonic system for determining and adjusting header height as the combine moves through a field. This latter approach is expensive and of limited reliability.

The present invention addresses the aforementioned limitations of the prior art by providing the combine header height detector and control which is particularly adapted for mounting to the leading end of a polyurethane head housing, is highly reliable and resistant to breakage, and is easily retrofit on existing headers.

OBJECTS AND SUMMARY OF THE INVENTION

Accordingly, it is an object of the present invention to provide a sensor for determining the height above the ground of an agricultural apparatus as it traverses a field.

It is another object of the present invention to provide a height sensor for an agricultural header such as on a combine which is mounted to a forward end of the header for more accurate height positioning of the header to reduce combine ingestion and header impact damage.

It is yet another object of the present invention to provide a height sensor for an agricultural header which is particularly adapted for use with non-metal headers and may be easily retrofit in existing header installations.

This invention is directed to a height sensor for detecting the height of a combine header above the soil as the combine traverses a field. The height sensor provides a control signal to a conventional height controller in the combine for controlling header height above the soil to prevent impact damage to the header, while maintaining the header a predetermined height above the soil. The height sensor includes a pre-loaded flexible arm attached to the forward end of the head housing. The distal end of the flexible arm is provided with a ball-like member which engages the soil, while the proximal end of the arm is connected to an angular displacement detector. The angular displacement detector detects angular displacement of the arm as it is pivotally displaced upon encountering terrain irregularities and obstacles in the soil for providing a height control signal to the combine's height controller. Flexibility in the sensor arm is provided by a coiled spring which connects a rigid shaft of the arm to the angular displacement detector. The height sensor is mounted to an existing bracket in the head housing, which bracket is used for attaching a steel tip to the leading edge of the head housing.

More generally, this invention contemplates apparatus for maintaining an elevated moving body a designated height above an irregular support surface, the apparatus comprising: a pre-loaded flexible arm coupled to the moving body and having first and second opposed ends, wherein the first end of the flexible arm engages and is displaced over the support surface as the moving body moves above the support surface; an angular deflection sensor coupled to the second end of the flexible arm for measuring a deflection of the flexible arm when the first end of the arm encounters an irregularity in the support surface as the body moves above the support surface and for providing a signal representing the extent of deflection of the flexible arm; and a controller coupled to the moving body and to the angular deflection sensor and responsive to the signal for raising or lowering the moving body in accordance with the signal and maintaining the moving body a designated height above the support surface.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF PREFERRED EMBODIMENT

Figure 1:
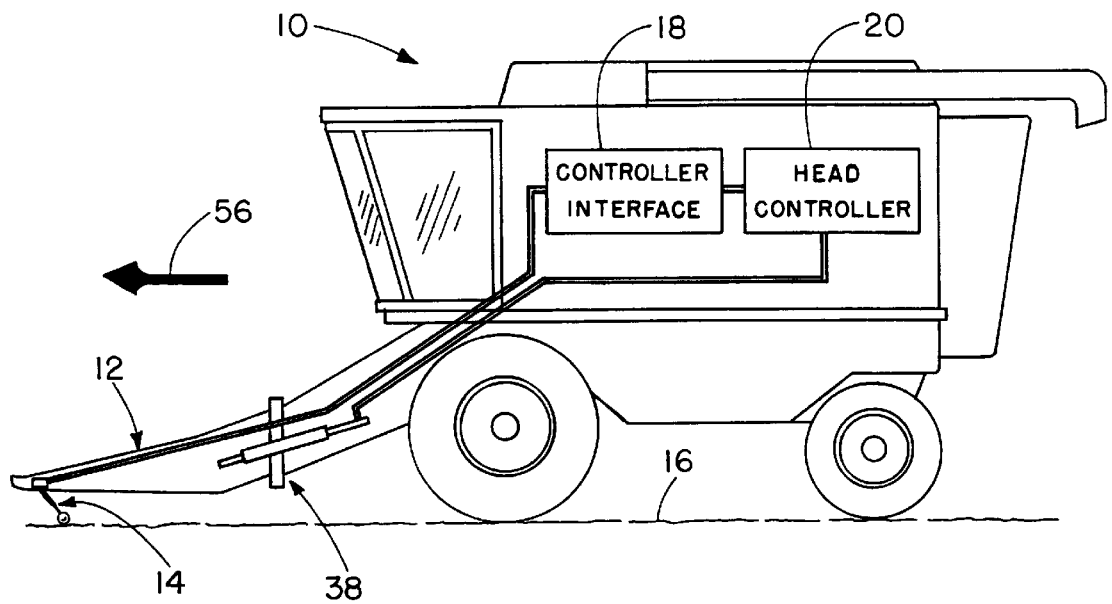
FIG. 1 is a simplified combined schematic and block diagram of a combine illustrating the location of the height sensor in the combine header.

Referring to FIG. 1, there is shown in simplified schematic and block diagram form a combine 10 having attached to a forward, or leading, portion thereof a corn header 12. Corn header 12 is attached to the combine 10 by conventional means such as mounting brackets and bolts (not shown for simplicity) and includes a plurality of spaced head units adapted to pass between adjacent crop rows during harvesting of the crop. Disposed on a forward portion of one or more head units is a corn head height sensor 14 in accordance with the present invention. The corn head height sensor 14 is connected by suitable electrical means to a controller interface 18 and a head controller 20 within combine 10. In response to the detected height of the corn header 12, head controller 20 provides suitable electrical control signals to an electrically actuated, hydraulic control system 38 for controlling the lateral position of the corn header 12 as well as its height above the ground, or soil, 16 as the combine 10 traverses a field in the direction of arrow 56. Head controller 20 is conventional in design and operation and, in general, receives an analog electrical signal from the controller interface 18 and outputs an analog signal to the hydraulic control system 38. Controller interface 18 is also conventional in design and operation and converts five angular sensor inputs from the height sensor 14 to a continuous output that changes in magnitude with the angle of displacement of the height sensor as described below. In a specific embodiment of the present invention, head controller 20 is as incorporated in a Deere combine, while controller interface 18 is available from May-Wes. While the present invention is disclosed primarily for use with a corn header 12, this invention is not limited to use with this type of head assembly, but will operate equally as well with virtually any type of header assembly used in the harvesting of various crops. In addition, while the inventive height sensor 14 is particularly adapted for use with polyurethane head housings and can be easily retrofit on these types of head housings, the invention is equally well suited for use with head housings of the sheet metal type. Finally, the present invention will also operate equally as well in maintaining virtually any type of agricultural mechanism a predetermined height above the soil surface as the mechanism traverses a field as described in the following paragraphs.

Figure 2:
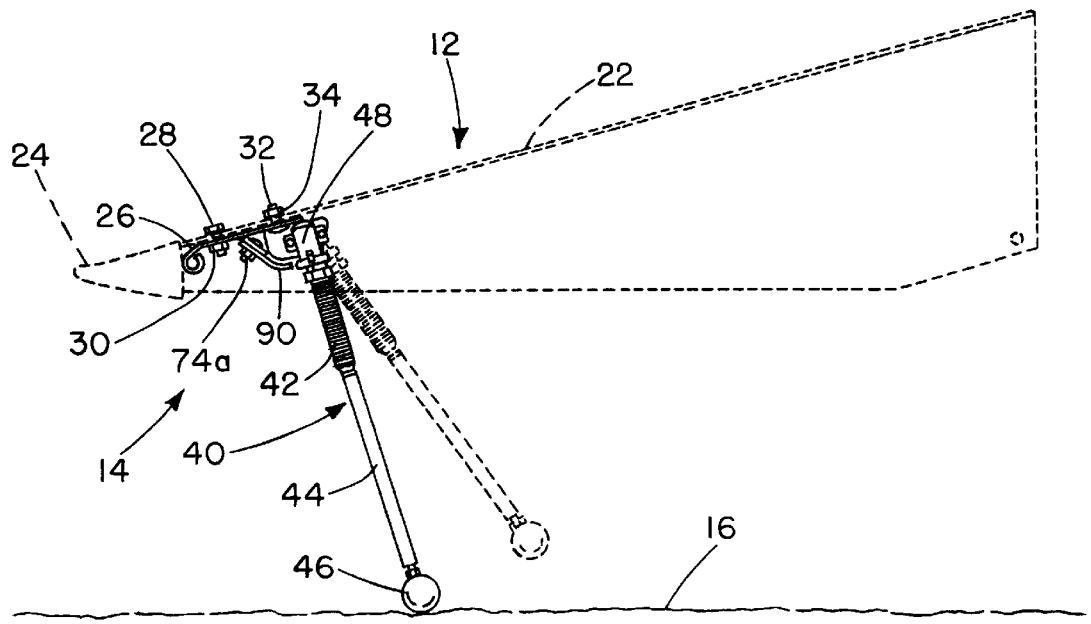
FIG. 2 is a side elevation view shown partially in phantom of a height sensor mounted to a corn head in accordance with the present invention.
Figure 3:
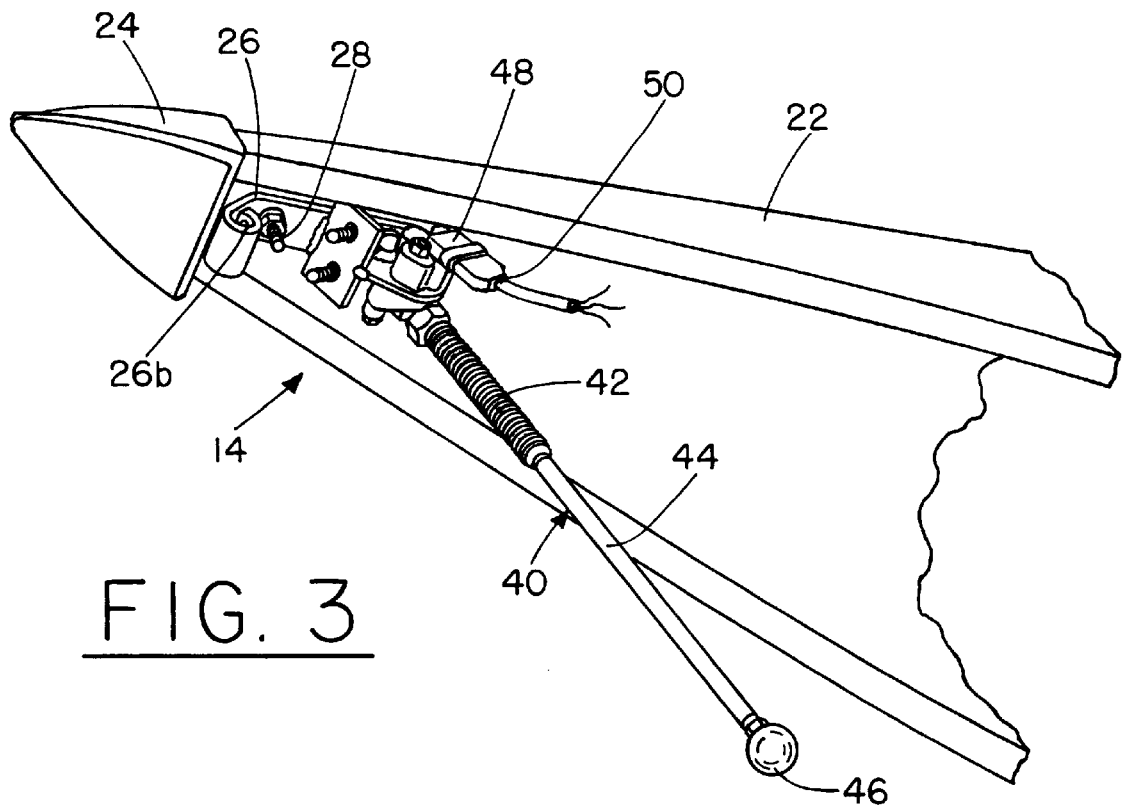
FIG. 3 is a perspective view of the underside of a forward portion of a corn head incorporating a height sensor in accordance with the present invention.
Figure 4:
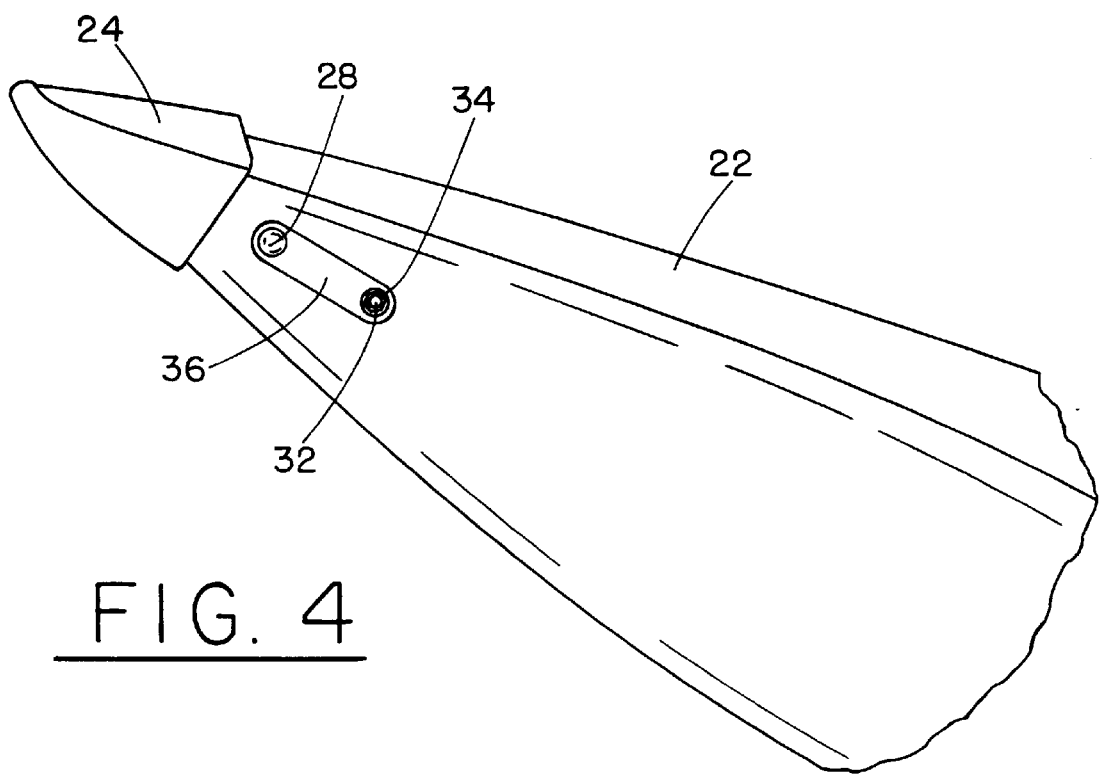
FIG. 4 is a perspective view of the forward upper portion of a corn head to which a height sensor in accordance with the present invention is attached.

Referring to FIGS. 2 and 3, there are respectively shown side elevation and lower perspective views of the height sensor 14 of the present invention. FIG. 4 is a perspective view of the upper end portion of the corn head housing 22 to which the height sensor is attached, while FIGS. 5 and 6 are partial perspective views of the inventive height sensor 14 respectively shown assembled and in exploded form.

Disposed on the forward, or leading, end of the corn head housing 22 is a metal tip 24 which protects the housing as it moves through a field. Disposed immediately aft of metal tip 24 on a lower portion of the corn head housing 22 is a metal bracket, or strap, 26. Bracket 26 assists in maintaining the metal tip 24 on the forward end of the corn head housing 22 and includes a loop 26b through which a metal rod (not shown for simplicity) may be inserted for storing the housing in a generally vertical, suspended manner. Metal tip 24 and bracket 26 are conventional head components and can be found on corn heads manufactured and sold by John Deere Co. of Moline, Ill. Bracket 26 is securely attached to the forward end of corn head housing 22 by means of a mounting bracket 36 and a first bolt 28 and nut 30 combination and a second bolt 32 and nut 34 combination. Mounting bracket 36 is disposed on an upper surface of the head housing 22, while bracket 26 is disposed on a lower surface of the housing. Corn head housing 22 is preferably comprised of a lightweight polyurethane plastic, but may also be comprised of sheet metal. By employing structure already incorporated in the corn head housing 22, i.e., bracket 26 and mounting bracket 36, additional holes or attachment structure need not be incorporated in the corn head housing in mounting the height sensor 14 of the present invention. This is a primary advantage of the present invention because of the difficulty and structure-weakening tendency of incorporating additional holes in the polyurethane head housing. Another important advantage of the inventive height sensor 14 is in its position at the forward end of the corn head housing 22, rather than in a position adjacent an intermediate portion of the housing, so as to provide an early indication of a high point in the terrain or an obstruction in the soil requiring the raising of the corn header to prevent damage.

Figures 5, 6:
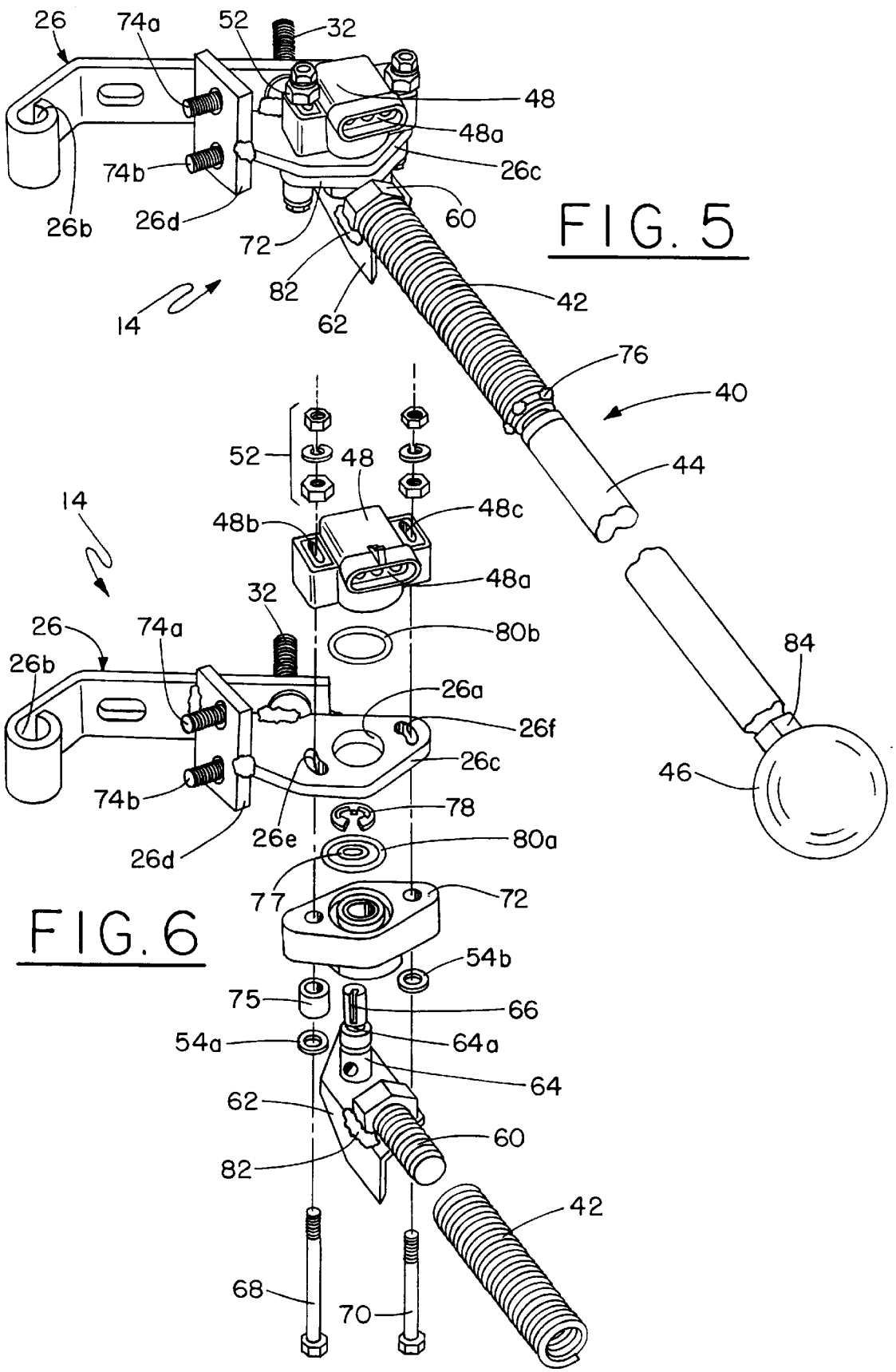
FIG. 5 is a partial perspective view of an assembled header height sensor in accordance with the present invention.
FIG. 6 is a partial exploded perspective view of the header height sensor of the present invention.

Attached to an aft portion of bracket 26 is the combination of a flange 26c and a plate 26d as more clearly shown in FIGS. 5 and 6. Extending through plate 26d are first and second mounting bolts 74a and 74b for attaching a guard or shield plate 90 as shown in FIG. 2 to the height sensor 14 for shielding the sensor and associated electrical wiring from dust and debris in the field. Flange 26c includes an aperture 26a therein. Positioned on opposing sides of flange 26c are a nylon bushing 72 and a rotation sensor 48. Bushing 72 and rotation sensor 48 have aligned apertures, which apertures are further aligned with aperture 26a in flange 26c. First and second O-rings 80a and 80b are disposed in respective facing circular slots in bushing 72 and rotation sensor 48 and engage opposed surfaces of flange 26c to provide a seal between the bushing and rotation sensor and the flange. Inserted through the aligned apertures of bushing 72 and rotation sensor 48 and extending through the aperture 26a and flange 26c is a shaft 64 which is attached to a bracket 62. A distal end of shaft 64 is inserted in the rotation sensor 48 and includes a detente, or slot, 66 which is keyed to a complementary aperture and projection arrangement (not shown) within the rotation sensor 48. The keyed mating of shaft 64 and rotation sensor 48 is conventional and well known to those skilled in the relevant arts. Shaft 64 has a first annular slot, or groove, 64a disposed about the periphery thereof which is adapted to receive a e-clip 78 which retains the shaft on bushing 72. Shaft 64 also has a second annular slot disposed about its periphery which is adapted to receive a rubber O-ring 77 which provide a seal between the shaft and bushing 72 for protecting the electrical components within the rotation sensor 48 from dust and debris. Also in a conventional manner, rotation sensor 48 provides an electrical output signal via connector 48a and an electrical lead 50 as shown in FIG. 3. The electrical output from rotation sensor 48 indicating the rotational position of shaft 64 and bracket 62 is provided to the head controller 20 in combine 10 as shown in FIG. 1 and as described above.

Bushing 72 is placed in contact with a first lateral surface of flange 26c, while rotation sensor 48 is placed in contact with a second, opposed surface of the flange. Bushing 72 and rotation sensor 48 are securely coupled together and attached to flange 26c by means of the combination of first and second bolts 68 and 70 and a plurality of washers 54a and 54b and nuts and lock washers 52. The first and second bolts 68,70 are inserted through aligned apertures in the rotation sensor 48 and bushing 72. It is in this manner that bracket 62 and shaft 64 extending therefrom are securely connected to bracket 26 as well as to the rotation sensor 48. Rotation of bracket 62 relative to the rotation sensor 48 results in the output of an appropriate electrical signal by the rotation sensor indicating the extent of relative rotation between the bracket and the fixed rotation sensor. A pair of apertures 48b and 48c within the rotation sensor 48 are each aligned with a respective aperture 26e and 26f within flange 26c for receiving the aforementioned first and second bolts 68 and 70. Each of the apertures 48b,48c and 26e,26f is elongated permitting the rotational position of rotation sensor 48 about shaft 64 to be adjusted as desired. Allowing for the rotational adjustment of rotation sensor 48 about shaft 64 permits each of a plurality of height sensors on a header to be adjusted so that the height above the soil is measured uniformly along the length of the header for more accurate header height measurement and control. An annular member 75 is disposed on bolt 68 and serves as a rotation stop for the height sensor 14 by engaging bracket 62 when sensor arm 40 is in the full down position when in use in a field. Calibration of each of a plurality of height sensors 14 mounted to a header in the full down position is accomplished by appropriate rotation of each rotation sensor 48 about its associated shaft 64 using the aforementioned elongated slots 48b and 48c in the sensor and 26e and 26f in flange 26c.

Attached to bracket 62 by means of a weldment 82 is a spring mounting bolt 60. The threaded end portion of spring mounting bolt 60 is adapted to receive a proximal end of a coil spring 42. A distal end of coil spring 42 is attached to a first end of a rigid shaft 44. Coil spring 42 and shaft 44 are preferably comprised of a high strength steel and are securely coupled together by means of a plurality of weldments 76 disposed about their juncture. Attached to a distal end of shaft 44 by means of a nut and bolt combination 84 is a ball 46 preferably comprised of a high strength plastic. Coil spring 42 is preferably pre-loaded so that a force of at least 15 pounds is required to bend, or flex, the spring. The flexibility of spring 42 allows the ball 46 disposed on its distal end to impact obstructions in a field without damage or breakage and also prevents damage to the height sensor in the event the ball engages an obstruction when the combine is reversed in direction.

Figure 7:
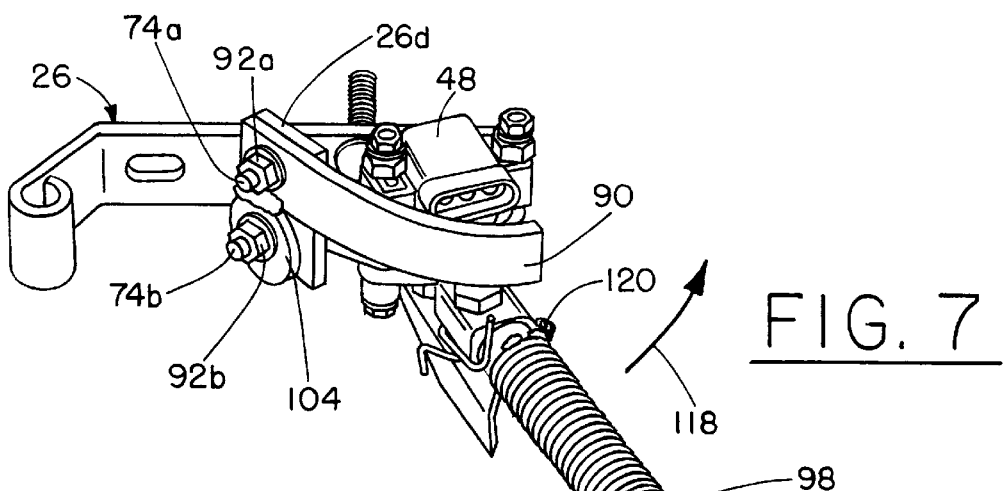
FIG. 7 is a partial perspective view of an assembled header height sensor in accordance with another embodiment of the present invention.

Referring to FIG. 7, details of the manner in which guard plate 90 is mounted to bracket 26 are shown. Included in a first end of the curved guard plate 90 is an aperture (not shown for simplicity) through which bolt 74a is inserted for attaching the guard plate to plate 26d of bracket 26. Attached to the first end of guard plate 90 is a mounting washer 104 also including an aperture (not shown) through which a second bolt 74b is inserted. Nuts 92a and 92b threadably engage bolts 74a and 74b, respectively, for securely attaching guard plate 90 to plate 26d of bracket 26. Mounting washer 104 is attached to the first end of the guard plate 90 by conventional means such as a weldment. Guard plate 90 protects the rotation sensor 90 and other components of the corn head height sensor from plant debris, loose soil, rocks and other hazards as the combine traverses a field.

Figure 8:
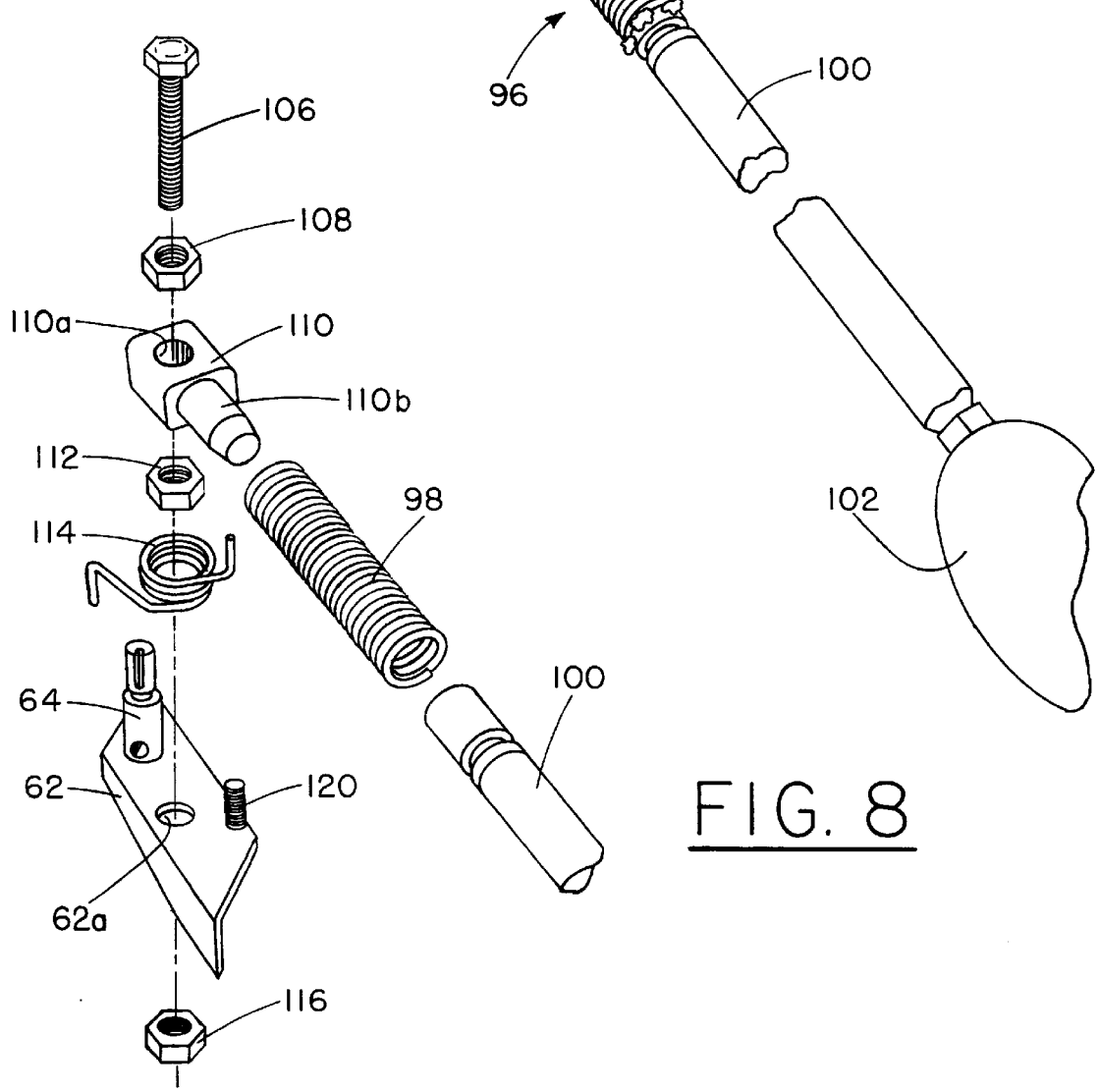
FIG. 8 is a partial exploded perspective view of the header height sensor shown in FIG. 7.

Also shown in FIG. 7 is a second embodiment of a sensor arm 96 for use in the present invention. FIG. 8 is in an exploded perspective view showing the manner in which sensor arm 96 is connected to the rotating bracket 62 which, as previously described, is connected to rotation sensor 48 by means of shaft 64. The embodiment of the sensor arm 96 shown in FIGS. 7 and 8 includes a linear, elongated coiled spring 98 connected at its distal end by means of weldments to a rigid, elongated shaft 100. Attached to the distal end of shaft 100 is a ball 102 in the shape of an ellipsoid which engages the soil as the combine traverses a field. A shaft 110b extending from a bracket 110 is inserted in and attached to the proximal end of coil spring 98 by means of weldments. Bracket 110 is pivotally coupled to bracket 62 which, in turn, is pivotally coupled to bracket 26 as previously described.

Attached to bracket 62 is a cylindrical shaft 64 which is inserted in and coupled to rotation sensor 48 as in the previously described embodiment. Bracket 62 further includes a circular aperture 62a. Circular aperture 62a is adapted for receiving a mounting bolt 106 which is inserted through an aperture 110a in bracket 110 as well as through a coiled spring 114. Nuts 108, 112 and 116 securely connect the combination of bracket 110 and coiled spring 114 to bracket 62. With bracket 62 freely rotatable with respect to bracket 26 and rotation sensor 48, the rotational position of bracket 62 will change as ball 102 engages irregular terrain as the combine traverses a field. Coiled spring 114 urges sensor arm 96 in a counterclockwise direction of rotation about the motion sensor 48 as shown by the direction of arrow 118 in FIG. 7. Coiled spring 114 thus maintains the sensor arm 96 at an inclined angle, with the ball 102 trailing the bracket 26 as the ball engages the soil as the combine traverses a field. If the direction of the combine is reversed, coiled spring 114 allows for the rotation of sensor arm 96 in a direction opposite to arrow 118 to prevent damage to the sensor arm. Because coiled spring 114 provides this protection for the sensor arm 96 in the event the combine is displaced rearwardly, elongated, linear coiled spring 98 is unnecessary in the embodiment shown in FIGS. 7 and 8 to provide this protection against damage to the sensor arm 96. Inserted through and connected to bracket 62 is a bolt 120. Bolt 120 limits rotational displacement of sensor arm 96 in the direction of arrow 118 shown in FIG. 7 by engaging shaft 110b extending from bracket 110. Bolt 120 thus also limits rotation of sensor arm 96 in the direction of arrow 118 and ensures that rotational displacement of sensor arm 96 and bracket 62 is the same. This ensures that the rotation of shaft 64 connected to bracket 62 provides an accurate indication of rotational displacement of sensor arm 96 and the height of the terrain traversed by ball 102.

There has thus been shown a height sensor for detecting the height above the soil of an agricultural apparatus such as a combine header as it traverses a field. The height sensor provides an electrical signal to a height controller in the combine for maintaining the header a predetermined height above the soil. The height sensor includes a pre-loaded flexible arm attached to a forward end of the head housing for providing an early height control signal to allow for header height adjustment at high operating speeds so that terrain irregularities and obstructions such as rocks in the field are avoided. The distal end of the flexible arm is provided with a ball-like member which engages the soil, while the proximal end of the arm is coupled to an angular displacement detector. The detector determines the angular displacement of the arm as it is pivotally displaced upon encountering terrain irregularities or an obstacle in the field for providing the height control signal to the combine's height controller. A coil spring in the sensor arm provides the arm with the flexibility necessary to avoid damage or breakage to the sensor upon impact with obstructions during operation or when the combine is reversed in direction. The height sensor is particularly adapted for use with head housings comprised of polyurethane and may be retrofit on existing header assemblies by mounting it to existing structure on the head housing.

While particular embodiments of the present invention have been shown and described, it will be obvious to those skilled in the art that changes and modifications may be made without departing from the invention in its broader aspects. Therefore, the aim in the claims is to cover all such changes and modifications as fall within the true spirit and scope of the invention. The matter set forth in the foregoing description and accompanying drawings is offered by way of illustration only and not as a limitation. The actual scope of the invention is intended to be defined in the claims when viewed in their proper perspective based on the prior art.

I claim:

1. Apparatus for maintaining a non-cut crop header disposed on a forward portion of a combine a designated height above the soil as the combine traverses a field, said apparatus comprising:
   a pre-loaded, generally linear flexible arm coupled to a forward portion of the header and having first and second opposed ends, wherein the first end of said flexible arm engages and is displaced over the soil as the header moves above the soil;
   angular deflection sensing means coupled to the second end of said flexible arm for measuring a deflection of said flexible arm when the first end of said flexible arm encounters irregularities in the soil as the header moves above the soil and for providing a first signal representing the extent of deflection of said flexible and; and
   control means coupled to said header and said angular deflection sensing means and responsive to said first signal for raising or lowering the header in accordance with said first signal in maintaining the header a designated height above the soil, wherein said flexible arm and angular deflection sensing means are attached to a head housing disposed on a forward portion of said combine and said head housing is comprised of polyurethane and includes a metal tip and am mounting bracket for attaching said metal tip to a forward end of said head housing, and wherein said mounting bracket further couples said flexible arm to a forward end of said head housing.

2. The apparatus of claim 1 wherein said flexible arm includes, in combination, a coil spring coupled to a rigid shaft, and wherein said coil spring is coupled to said angular defection sensing means and said rigid shaft is displaced over the soil.

3. The apparatus of claim 2 further comprising a spherical member attached to a distal end of said rigid so for engaging the soil.

4. The apparatus of claim 1 further comprising biasing means for urging said flexible arm downward into engagement with the soil.

5. The apparatus of claim 4 wherein said biasing means includes a coil spring.

6. The apparatus of claim 1 further comprising first stop means for limiting upward deflection of said flexible arm.

7. The apparatus of claim 6 further comprising second stop means for limiting downward deflection of said flexible arm.

8. The apparatus of claim 1 further comprising guard means for shielding said angular deflection sensing means from debris in or on the soil.

9. The apparatus of claim 8 wherein said guard means includes a curved bar disposed adjacent said angular deflection sensing means.

10. The apparatus of claim 1 further comprising calibration means for adjusting a position of said flexible arm when engaging the soil in a full down position.

11. The apparatus of claim 10 wherein said calibration means includes an adjustable mounting arrangement for rotationally displacing said angular deflection sensing means so that said flexible arm engages the soil when in said full down position.

12. Apparatus for maintaining a non-cut crop header in a crop harvester a designated height above the soil as the crop harvester traverses a field, said apparatus comprising:
   a generally linear arm coupled to the header and having first and second opposed ends, wherein the first end of said arm engages and is displaced over the soil as the header moves above the soil;
   angular deflection sensing means coupled to the second end of said arm for measuring a deflection of said arm when the first end of said arm encounters irregularities in the soil as the header moves above the soil and for providing a first signal representing the extent of deflection of said arm;
   biasing means for urging said arm to a selected inclined orientation relative to vertical, wherein said arm in said selected inclined orientation extends below and aft of said angular deflection sensing means as the crop harvester moves in a forward direction, said biasing means allowing for forward displacement of the first end of said arm beyond vertical when the crop harvester is moved rearwardly while the first end of said arm engages the soil without damaging said arm, with said biasing means again urging said aim to said selected inclined orientation when the crop harvester is again moved in the forward direction or when the second end of said arm is removed from contact with the soil; and
   control means coupled to said header and said angular deflection sensing means and responsive to said first signal for raising or lowering the header in accordance with said first signal in maintaining the header a designated height above the soil, wherein said flexible arm and angular deflection sensing means are attached to a head housing disposed on a forward portion of said combine and said head housing is comprised of polyurethane and includes a metal tip and a mounting bracket for attaching said metal tip to a forward end of said head housing, and wherein said mounting bracket further couples said flexible arm to a forward end of said head housing.

13. The apparatus of claim 12 further comprising a mounting bolt for connecting the second end of said arm to said angular deflection sensing means, wherein said biasing means includes a first coiled spring connected between said angular deflection means and said arm and disposed about said mounting bolt.

14. The apparatus of claim 13 further comprising first and second pivotally coupled brackets for connecting the second end of said arm to said angular deflection sensing means.

15. The apparatus of claim 14 wherein said angular deflection sensing means is a rotation sensor and said first bracket includes an elongated shaft connected to said rotation sensor.

16. The apparatus of claim 15 wherein said mounting bolt pivotally couples said first and second brackets, and wherein said coiled spring is disposed about said mounting bolt and engages said first and second brackets.

17. The apparatus of claim 16 further comprising first rotation stop means for limiting upward deflection of said arm relative to said second bracket so that rotation of said elongated shaft provides an accurate indication of rotational displacement of said arm and the height of the soil.

18. The apparatus of claim 12 wherein said arm is pre-loaded and flexible and includes, in combination, a coil spring coupled to a rigid shaft, and wherein said coil spring is coupled to said angular deflection sensing means and said rigid shaft is displaced over the soil.

19. The apparatus of claim 18 further comprising a spherical member attached to a distal end of said rigid shaft for engaging the soil.

20. The apparatus of claim 18 further comprising second rotation stop means for limiting downward deflection of said arm.

21. The apparatus of claim 12 further comprising guard means for shielding said angular deflection sensing means from debris in or on the soil.

22. The apparatus of claim 21 wherein said guard means includes a curved bar disposed adjacent said angular deflection sensing means.

23. The apparatus of claim 12 further comprising calibration means for adjusting a position of said flexible arm when engaging the soil in a full down position.

24. The apparatus of claim 23 wherein said calibration means includes an adjustable mounting arrangement for rotationally displacing said angular deflection sensing means so that said flexible arm engages the soil when in said full down position.

25. The apparatus of claim 12 wherein said arm is an elongated, linear, rigid shaft.

26. The apparatus of claim 25 further comprising a bulbous member attached to the first end of said rigid shaft for engaging and being displaced over the soil.

27. For use on a plastic non-cut crop header housing disposed on a forward portion of a combine used in the harvesting of crops, said header housing have a tip mounted to a forward end thereof by means of a mounting bracket, an arrangement for determining the height of the header housing above the soil as the combine traverses a field, said arrangement comprising:

a rotation sensor disposed in a lower, forward portion of the header;

an elongated, linear shaft having first and second opposed ends, wherein said first end is coupled to said rotation sensor and said second end engages the soil, and wherein said shaft rotationally displaces said rotation sensor as the second end of said shaft engages and passes over irregularities in the soil; and a flange connecting said rotation sensor to the mounting bracket for mounting said rotation sensor on a lower portion of the forward end of the plastic header housing, wherein said mounting bracket includes a strap and a bracket respectively disposed on lower and upper surfaces of the header housing and connected together by at least one nut and bolt combination.

28. The arrangement of claim 27 wherein said flange includes an aperture therein and wherein the first end of said elongated, linear shaft includes a rod member extending through the aperture in said flange and coupled to said rotation sensor.

29. The arrangement of claim 28 further comprising a plate mounted to a forward portion of said flange for attaching guard means for shielding said rotation sensor from dirt and debris in the field.

30. The arrangement of claim 29 wherein said guard means includes a curved metal member disposed beneath said rotation sensor.

31. The arrangement of claim 30 wherein said elongated, linear shaft is rigid.

32. The arrangement of claim 30 wherein said elongated, linear shaft includes a rigid shaft coupled to a flexible coiled spring.

33. The arrangement of claim 31 further comprising a bulbous member disposed on the second end of said elongated, linear shaft.

34. The arrangement of claim 27 wherein the header housing is comprised of polyurethane.

* * * * *

UNITED STATES PATENT AND TRADEMARK OFFICE
CERTIFICATE OF CORRECTION

PATENT NO. : 6,202,395 B1
DATED : March 20, 2001
INVENTOR(S) : Richard Gramm

Page 1 of 1

It is certified that error appears in the above-identified patent and that said Letters Patent is hereby corrected as shown below:

Title page,
Item [76], Inventor Richard Gramm, 3529 Fir Road, Bremen, IN (US) 46506

Column 7,
Line 52, after "and" before "mounting" delete "am" insert -- a --
Line 63, after "rigid" before "for" delete "so" insert -- shaft --

Signed and Sealed this

Twenty-seventh Day of November, 2001

Attest:

NICHOLAS P. GODICI
Attesting Officer   Acting Director of the United States Patent and Trademark Office